(12) United States Patent
Reich et al.

(10) Patent No.: US 11,243,133 B2
(45) Date of Patent: Feb. 8, 2022

(54) DIAGNOSTIC APPARATUS, SYSTEM AND METHOD

(71) Applicant: FESTO AG & Co. KG, Esslingen (DE)

(72) Inventors: Jan Reich, Filderstadt (DE); Holger Steltner, Esslingen (DE); Uwe Leonhardt, Eislingen (DE)

(73) Assignee: FESTO SE & CO. KG, Esslingen (DE)

(*) Notice: Subject to any disclaimer, the term of this patent is extended or adjusted under 35 U.S.C. 154(b) by 322 days.

(21) Appl. No.: 16/375,277

(22) Filed: Apr. 4, 2019

(65) Prior Publication Data

US 2019/0310157 A1 Oct. 10, 2019

(30) Foreign Application Priority Data

Apr. 9, 2018 (DE) .......................... 102018205311.1

(51) Int. Cl.
| | | |
|---|---|---|
| *G01L 27/00* | (2006.01) | |
| *G01L 27/02* | (2006.01) | |
| *F15B 19/00* | (2006.01) | |

(52) U.S. Cl.
CPC .......... *G01L 27/007* (2013.01); *F15B 19/005* (2013.01); *G01L 27/02* (2013.01); *F15B 2211/87* (2013.01)

(58) Field of Classification Search
CPC ...... G01L 27/007; G01L 27/02; F15B 19/005; F15B 2211/87; F15B 2211/6336
See application file for complete search history.

(56) References Cited

U.S. PATENT DOCUMENTS

| 5,109,692 A | 5/1992 | Fitzgerald | |
|---|---|---|---|
| 2017/0184215 A1* | 6/2017 | Junk | F16K 31/1221 |
| 2019/0390691 A1* | 12/2019 | Friman | F15B 19/007 |

FOREIGN PATENT DOCUMENTS

| DE | 4218320 A1 | 12/1993 |
|---|---|---|
| DE | 10258873 A1 | 7/2003 |
| DE | 10303889 B3 | 4/2004 |
| DE | 102016200924 A1 | 7/2017 |

\* cited by examiner

*Primary Examiner* — David Z Huang
(74) *Attorney, Agent, or Firm* — Hoffmann & Baron, LLP (57) ABSTRACT

A diagnostic apparatus for a fluidic actuator, in particular a fluidic valve drive, which has an actuator element displaceable into different positions ($x_1$, $x_2$, $xp_1$, $xp_2$), wherein the diagnostic apparatus is configured to provide a first break-away pressure measured value ($pi_1$) for a first position of the actuator element. The diagnostic apparatus is further configured to determine, based on the first break-away pressure measured value ($pi_1$) and break-away pressure reference information ($pri$) stored in the diagnostic apparatus, a first break-away pressure prediction value ($pp_1$) for a first prediction position ($xp_1$) of the actuator element, the first prediction position being different from the first position ($x_1$).

17 Claims, 4 Drawing Sheets

DIAGNOSTIC APPARATUS, SYSTEM AND METHOD

BACKGROUND OF THE INVENTION

The invention relates to a diagnostic apparatus for a fluidic actuator, in particular a fluidic valve drive. The fluidic actuator comprises an actuator element displaceable into different positions. The diagnostic apparatus is configured to provide a first break-away pressure measured value for a first position of the actuator element.

In order to set the actuator element into motion, a working pressure is applied to the fluidic actuator. The pressure value of the working pressure, at which the actuator element begins to move from a rest position, is referred to as the break-away pressure. The term "break-away pressure measured value" in particular means an actually recorded break-away pressure.

A break-away pressure measured value of a fluidic actuator can, for example, be recorded for the purpose of drawing a conclusion concerning a state of wear of the fluidic actuator. In the case of wear of the fluidic actuator, a friction coefficient of the fluidic actuator can, for example, change, in particular increase, whereby the break-away pressure measured value of the fluidic actuator changes. A changed break-away pressure measured value can consequently be an indicator that a certain state of wear is present.

The break-away pressure measured value is expediently determined for the position at which the actuator element is currently located; i.e. the aforementioned first position of the actuator element is in particular the current position and/or an actually adopted position of the actuator element. The first position can also be referred to as a first measuring position.

DE 10 2016 200 924 A1 describes a method for determining a state of wear of a fluidically driven working device with two pressure chambers and a working element, which is moveable between a first and a second position by means of pressure application of the pressure chambers. A pressure difference between the pressure chambers is increased and a pressure value is recorded when a position change of the working element is detected. A state of wear is determined according to the recorded pressure value.

SUMMARY OF THE INVENTION

An object of the invention is to modify the diagnostic apparatus mentioned at the outset such that a more comprehensive assessment can be efficiently made concerning the state of the fluidic actuator.

The object may be achieved by a diagnostic apparatus which is configured to determine a first break-away pressure prediction value for a first prediction position of the actuator element, the first prediction position being different from the first position, the determination of the first break-away pressure prediction value being based on the first break-away pressure measured value and break-away pressure reference information stored in the diagnostic apparatus.

The term "prediction position" shall in particular refer to a position at which the actuator element is not currently located and/or a position which is not actually adopted by the actuator element (for the purpose of determining the break-away pressure prediction value).

The break-away pressure prediction value is in particular an estimate for how high the working pressure has to be in order to set the actuator element 15 into motion from the prediction position.

The diagnostic apparatus thus determines, in addition to the first break-away pressure measured value at the first position, the break-away pressure prediction value at the first prediction position. As such, a break-away pressure is determined for an additional position—for the prediction position.

In this manner, a more comprehensive assessment may be made concerning the state of the fluidic actuator. This takes place in a simple manner since the additionally determined information—the break-away pressure prediction value—is obtained on the basis of information already present, namely on the basis of the first break-away pressure measured value and the break-away pressure reference information. Thus, in particular no additional position change or measurement of the actuator element is required for obtaining the break-away pressure prediction value.

The break-away pressure prediction value is in particular helpful in order to assess the functionality and/or remaining service life of the fluidic actuator. If a determined break-away pressure prediction value is for example outside of the available pressure range, it can be assumed that the actuator element, if it is moved to the prediction position, cannot be set into motion from there (because the required break-away pressure cannot be reached). It can thus be assumed that the functionality of the fluidic actuator is impaired. Furthermore, based on how close a determined break-away pressure prediction value is to the limits of the available pressure range, the remaining service life of the fluidic actuator can be estimated. The diagnostic apparatus is expediently configured to provide wear information and/or information concerning the remaining service life in this manner Furthermore, the diagnostic apparatus is preferably configured to estimate, based on the development of a break-away pressure prediction value over time, in particular in relation to the limits of the available pressure range, a remaining service life of the fluidic actuator and to provide corresponding information.

The break-away pressure reference information can, for example, be obtained in advance and expediently represents one or a plurality of break-away pressures in a reference state, i.e. for example in a state without wear, of the fluidic actuator. The reference state can, for example, be present directly following installation of the fluidic actuator 6 in a pipe system of a process plant.

Based on the break-away pressure reference information and the first break-away pressure measured value, the break-away pressure prediction value is obtained, for example by determining a deviation between the break-away pressure reference information and the first break-away pressure measured value and extrapolating the break-away pressure prediction value on the basis of this deviation.

The invention further relates to a system with an above described diagnostic apparatus and a fluidic actuator with an actuator element.

The invention further relates to a method comprising the step: Providing a first break-away pressure measured value for a first position of an actuator element of a fluidic actuator. The method further comprises the step: Determining a first break-away pressure prediction value for a first prediction position of the actuator element, the first prediction position being different from the first position, the determining of the first break-away pressure prediction value being based on the first break-away pressure value and break-away reference information.

BRIEF DESCRIPTION OF THE DRAWINGS

Exemplary details and exemplary embodiments are explained below with reference to the figures, wherein.

DETAILED DESCRIPTION

Figure 1:
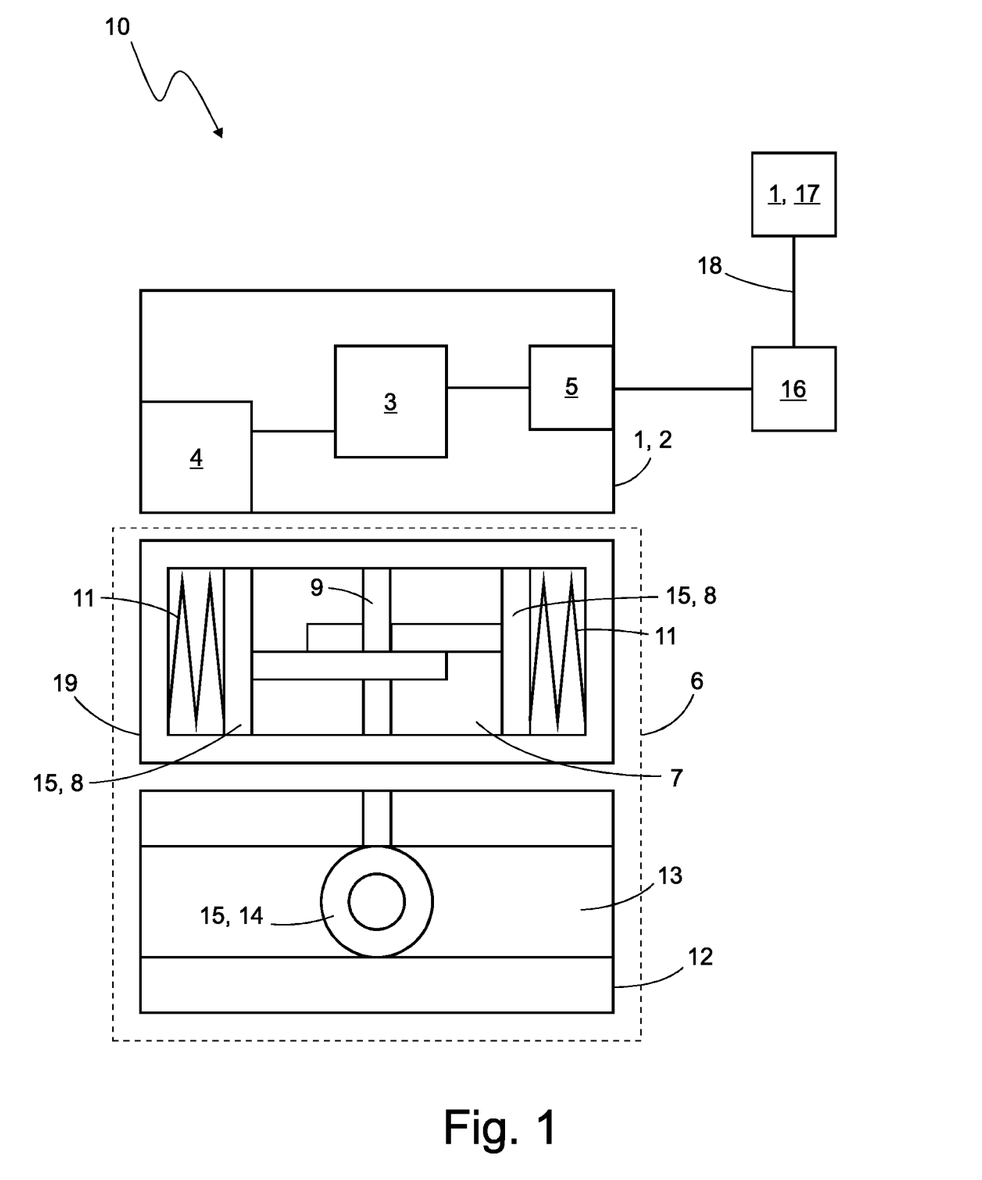
FIG. 1 shows a schematic representation of a system with a diagnostic apparatus and a fluidic actuator.

FIG. 1 shows a system 10, which represents an exemplary use environment for the diagnostic apparatus 1 according to the invention. The system 10 comprises the diagnostic apparatus 1 and a fluidic actuator 6.

The diagnostic apparatus 1 is for example implemented in a control apparatus 2, which is designed in particular as a position controller, control head and/or positioner. Alternatively or additionally, the diagnostic apparatus 1 can also be implemented on an external server 17, which is for example connected to the control apparatus 2 via a gateway 16 and/or a wide area network 18, in particular the internet.

The diagnostic apparatus 1 serves to perform a diagnosis of the fluidic actuator 6. The fluidic actuator 6 comprises an actuator element 15 displaceable into different positions. The fluidic actuator 6 comprises for example a valve drive 19 and/or a valve fitting 12. The actuator element 15 is for example a piston arrangement 8 of the valve drive 19 and/or a valve element 14 of a valve fitting 12.

The diagnostic apparatus 1 is configured to provide a first break-away pressure measured value $pi1$ for a first position $x1$ of the actuator element 15. An exemplary first position $x1$ and a break-away pressure measured value $pi1$ detected in this position $x1$ are plotted in FIG. 2. The break-away pressure measured value $pi1$ (and the further break-away pressure values shown in the graph) is marked with a black dot.

Figure 2:
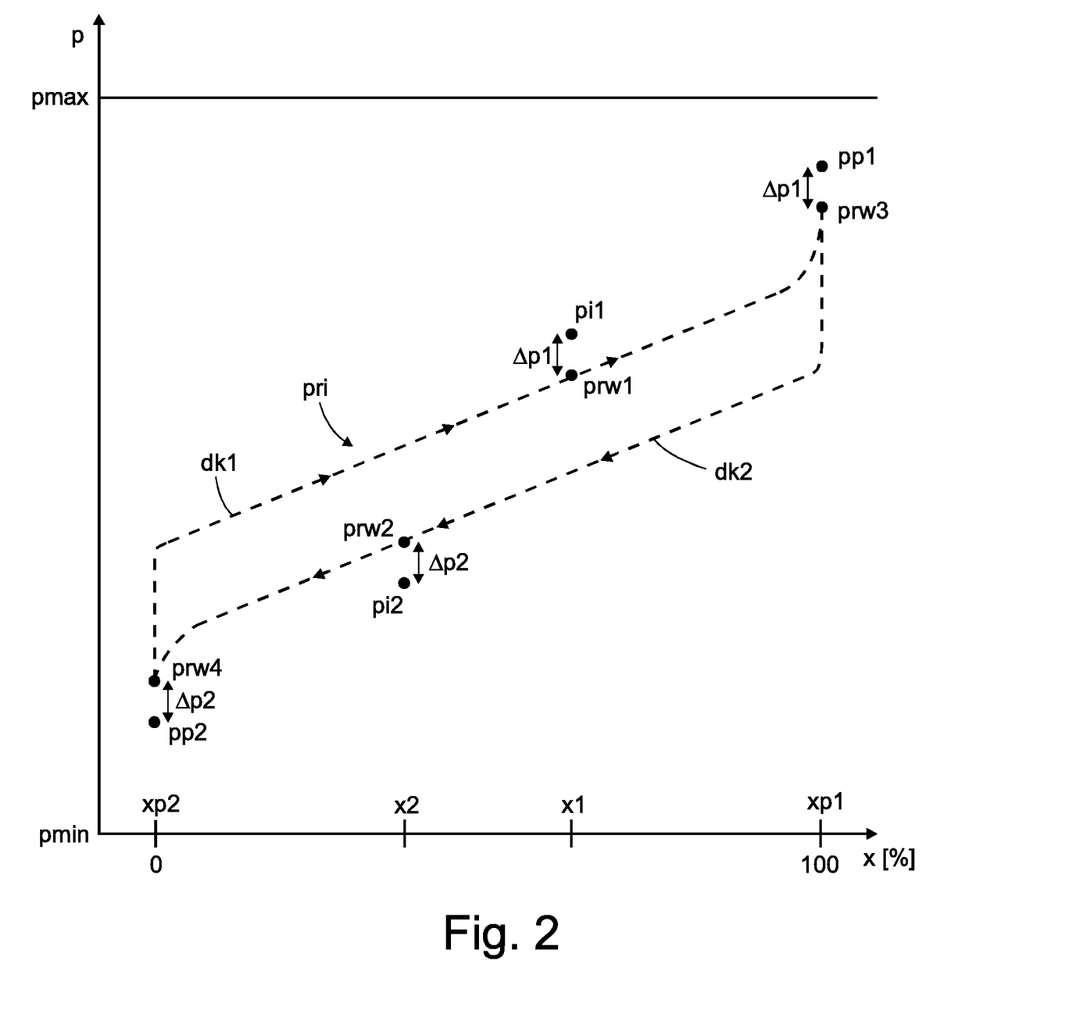
FIG. 2 shows a first graph, in which different pressure values are plotted in dependence of the position of the actuator element.

The diagnostic apparatus 1 is further adapted to determine a first break-away pressure prediction value $pp1$ for a first prediction position $xp1$ of the actuator element 15, the first prediction position $xp1$ being different from the first position $x1$, the determination of the first break-away pressure prediction value being based on the first break-away pressure measured value $pi1$ and break-away pressure reference information $pri$ stored in the diagnostic apparatus 1.

Based on the break-away pressure prediction value $pp1$ the functionality of the fluidic actuator 6 can be estimated, for example. As shown in FIG. 2, the break-away pressure prediction value $pp1$ is within the available pressure range, namely below the maximum working pressure $pmax$ that can be provided, and above the minimum working pressure $pmin$ that can be provided. Consequently, it can be assumed that it is possible to set the actuator element 15 into motion from the prediction position $xp1$, i.e. that the functionality of the fluidic actuator 6 is given here.

Further exemplary details are explained below.

Firstly, regarding the control apparatus 2:

The control apparatus 2 serves to provide a working pressure to actuate the fluidic actuator 6. The control apparatus 2 has, for this purpose, in particular a fluidic apparatus 4, for example one or a plurality of pilot valves.

The control apparatus 2 further has a control unit 3, which, for example, has one or a plurality of processors and is configured to control the fluidic apparatus 4, in particular according to an open loop control model and/or a closed loop control model stored in the control unit 3 and adapted to the fluidic actuator 6. The diagnostic apparatus 1 is expediently implemented by the control unit 3.

The control apparatus 2 further has, for example, a communication apparatus 5, with which the control apparatus 2 can in particular communicate with a superordinate controller (not shown) in order to obtain, for example, control commands according to which the fluidic apparatus 4 can be actuated. The communication apparatus 5 can further be used for communication with the (optionally available) external server 17.

The control apparatus 2 expediently has a housing in which the control unit 3, the fluidic apparatus 4 and/or the communication apparatus 5 are housed. The housing optionally has a mechanical interface (not shown) with which it can be attached to the fluidic actuator 6, in particular the valve drive 19.

Now regarding the fluidic actuator 6:

The fluidic actuator 6 expediently comprises the valve drive 19 and/or the valve fitting 12. Alternatively, the fluidic actuator 6 can also comprise a different fluidic drive, for example a fluidic cylinder, or a valve apparatus with integrated drive. The fluidic actuator 6 can in particular comprise a single-acting and/or a dual-acting drive. The fluidic actuator 6 can expediently comprise a rotary or pivot drive and/or a linear drive.

The fluidic actuator 6 comprises an actuator element 15, here for example the piston arrangement 8 and/or the valve element 14, which can be displaced into a plurality of positions. The actuator element 15 can expediently be displaced in one or two end positions and/or a plurality of positions between the two end positions. The positions can be rotary positions and/or displacement positions along a displacement path.

The fluidic actuator 6 comprises the valve drive 19. The valve drive 19 is, for example, designed as a single-acting rotary drive. Alternatively, the valve drive 19 can also be designed as a dual-acting drive and/or as a linear drive.

The valve drive 19 has at least one pressure chamber 7. Working pressure provided by the control apparatus 2 can be applied to the pressure chamber 7 in order to set the piston arrangement 8 into motion. Via the piston arrangement 8, a drive shaft 9 is set into motion with which the valve fitting 12 can then be actuated.

For example, the valve drive 19 has a return spring arrangement 11 with which a return force is applied to the piston arrangement 8. The return force counteracts a pressure fluid force acting due to the working pressure on the piston arrangement 8. The pressure fluid force acts in particular in a first movement direction of the actuator element 15 and the return force acts in a second movement direction opposite to the first movement direction.

The valve fitting 12 has a process fluid channel 13 in which the valve element 14 is arranged. The valve element 14 can be actuated by the valve drive 19, in particular the drive shaft 9, so that it changes its position. For example, the valve element 14 can be displaced into different rotary positions. The valve element 14 can expediently be displaced into a first and second end position. In the first end position, the process fluid channel 13 is for example blocked, and is unblocked in the second position. The valve fitting 12 can in particular be designed as a butterfly valve or a ball valve.

During operation, the control apparatus 2 in particular serves to displace the actuator element 15 into an instructed position by means of providing a working pressure. The position can for example be instructed by a superordinate controller as a control command to the control apparatus 2.

The control apparatus 2 is configured to provide the working pressure such that the actuator element 15 moves into a certain movement direction.

A movement of the actuator element 15 into a first movement direction will be discussed first below.

For example, in the first movement direction, the actuator element 15 must be moved against the return force. In order to set the actuator element 15 into motion in the first movement direction from a rest position, a break-away pressure is required, which causes a pressure fluid force in the direction of the first movement direction which is greater than the sum of the counteracting forces. In addition to the return force, further counteracting forces can occur, for example a frictional force and/or a loading force acting on the actuator element 15.

To move in the first movement direction, a working pressure must be provided, which is the same or greater than the break-away pressure. The break-away pressure may be dependent on the position of the actuator element 15, for example if a counteracting force, in particular the return force, depends on the position of the actuator element 15.

The relationship between the position of the actuator element 15 and the break-away pressure is shown in FIG. 2. The position of the actuator element 15 is plotted on the x-axis. The variable x can for example assume values from 0% to 100%; the positions for x=0% and x=100% can for example be end positions of the actuator element 15. The position x=100% can be referred to as first end position xp1 and the position x=0% can be referred to as second end position xp2.

The first movement direction runs for example from left to right and can also be referred to as a positive movement direction. The position-dependent break-away pressure in the first movement direction is plotted as the characteristic line dk1. The characteristic line dk1 (in the first movement direction) is for example monotonously increasing. The further the actuator element 15 is moved in the first movement direction, the greater the required break-away pressure in order to set the actuator element 15 into motion from a resting state. This is e.g. because the return force provided by the return spring arrangement 11 increases with increasing compression of the return spring arrangement 11.

For example, the break-away pressure, starting from the lower end position at position x=0%, increases with increasing position x (i.e. positive movement direction) roughly linearly since the return spring arrangement 11 of the fluidic actuator 6 must be increasingly compressed with increasing deflection. Shortly before reaching the upper end position xp1 at x=100%, the break-away pressure increases for example disproportionally, because in the case of further movement, the actuator element 15 must be pressed further into a sealing element (not shown) which requires additional force.

Now regarding a movement of the actuator element 15 in the second movement direction:

For example, the actuator element 15 is moved in the second movement direction in the direction of the return force. In order to set the actuator element 15 into motion in the second movement direction from a resting state (also referred to as "rest position"), a break-away pressure causing a pressure fluid force in the direction of the first movement direction and further forces acting in the first movement direction need to be together smaller than the sum of the forces acting in the second movement direction, in particular smaller than the return force. Additionally, a frictional force and/or a loading force acting on the actuator element 15 can for example act in the direction of the first movement direction. Additionally, a loading force acting on the actuator element 15 can for example act in the direction of the second movement direction.

To move in the second movement direction, a working pressure must be provided, which is the same or smaller than the break-away pressure. The break-away pressure may be dependent on the position of the actuator element 15, for example if a force acting in the second movement direction, in particular the return force, depends on the position of the actuator element 15.

The position-dependent break-away pressure in the second movement direction is plotted as the characteristic line dk2 in FIG. 2. The characteristic line dk2 (in the second movement direction) is for example monotonously decreasing; The further the actuator element 15 is moved in the second movement direction, the smaller the required break-away pressure in order to set the actuator element 15 into motion from the rest position. This is e.g. because the return force provided by the return spring arrangement 11 decreases with decreasing compression.

For example, in the case of a movement from the upper end position xp1 to lower x values (i.e. negative movement direction) the pressure initially has to be sharply reduced in order to overcome the static friction of valve drive 19 and/or valve fitting 12. For example, a somewhat linear decrease follows until shortly before the lower end position xp2 it is possibly necessary to work again against a sealing element which requires a further disproportionate pressure decrease.

The characteristic line dk2 lies for example below the characteristic line dk1. The characteristic line dk2 expediently runs at least in sections parallel to the characteristic line dk1.

For example, the break-away pressures are thus dependent on the movement direction and the position of the actuator element 15.

Furthermore, the break-away pressures in the first movement direction respectively constitute a lower limit value, which has to be reached or exceeded and the break-away pressures in the second movement direction respectively constitute an upper limit value, which has to be reached or undercut.

The characteristic lines dk1 and dk2 are for example part of the break-away pressure reference information pri, which is expediently provided in advance in the diagnostic apparatus 1, for example as a result of a test operation and/or a simulation (performed externally). The break-away pressure reference information pri can be stored in the diagnostic apparatus 1 in different manners, for example as a plurality of individual break-away pressure reference values (which for example are on the characteristic lines dk1 and/or dk2) and/or as a mathematical model, which for example describes the characteristic lines dk1 and/or dk2.

A break-away pressure can for example be captured in that, in a state, in which the actuator element 15 is in a rest position (also referred to as "resting state"), i.e. is not moving, the working pressure is increased or decreased by means of the control apparatus 2 and then, if a position change of the actuator element 15 is detected, a break-away pressure value is captured based on the current working pressure. As a break-away pressure value, an absolute pressure, a relative pressure and/or a pressure difference can for example be captured.

The detection of the position change can be carried out by a position sensor, which can for example be part of the diagnostic apparatus 1, in particular the control apparatus 2. The capturing of the break-away pressure value can be carried out by a pressure sensor, which can for example be part of the diagnostic apparatus 1, in particular the control apparatus 2.

The diagnostic apparatus 1, in particular the control apparatus 2 is expediently configured to perform a reference information generation procedure in order to respectively record a break-away pressure reference value for a plurality of different positions of the actuator element 15, for example in the aforementioned manner and to generate then, based on the captured break-away pressure reference values, the break-away pressure reference information pri. The diagnostic apparatus 1 is in particular configured to generate the break-away pressure reference information pri for both movement directions.

As already mentioned above, the diagnostic apparatus 1 is configured to capture a first break-away pressure measured value pi1. The diagnostic apparatus 1 is expediently configured to capture the first break-away pressure measured value pi1 during the normal operation of the fluidic actuator 6; i.e. in an operation in which the fluidic actuator 6 is used as intended and is actuated, for example, in order to influence the flow of a process fluid flowing through the process fluid channel 13. The fluidic actuator 6 is in particular installed in a process industry plant during normal operation.

The diagnostic apparatus 1 is in particular configured to capture the first break-away pressure measured value pi1 in the aforementioned manner; i.e. by increasing or decreasing the working pressure (in particular by means of the fluid apparatus 4) and capturing the first break-away pressure measured value pi1 based on the working pressure at which the actuator element 15 begins to move. The diagnostic apparatus 1 is in particular configured to do this during normal operation, for example as part of the processing of a movement request by a superordinate controller.

The diagnostic apparatus 1 is configured to capture the first break-away pressure measured value pi1 for the first position x1; i.e. the first break-away pressure measured value pi1 refers to the break-away pressure required to set the actuator element 15 into motion from a resting state in the first position x1. The first position x1 is in particular a current position and/or an actually adopted position of the actuator element 15. The first position is expediently a position at which the break-away pressure reference information pri has no maximum and/or no minimum.

The diagnostic apparatus 1 is configured to determine the first break-away pressure prediction value pp1 for the first prediction position xp1 based on the first break-away pressure measured value pi1 and based on the break-away pressure reference information pri. The first prediction position xp1 is expediently not a current and/or not an actually adopted position of the actuator element 15. The first prediction position is preferably a position, which can in principle be adopted by the actuator element 15, but does not have to be adopted for the purposes of determining the break-away pressure prediction value. For example, the first prediction position xp1 is a first end position of the actuator element 15. The first prediction position xp1 is expediently a position of the actuator element at which a break-away pressure reference value and/or the characteristic line dk1 is at its maximum or minimum.

By providing the break-away pressure prediction value pp1, an assessment can advantageously be made concerning a break-away pressure at a position—the prediction position—without this position having to be adopted. Therefore, this assessment can also be made during normal operation and not only during special manoeuvres such as a partial stroke test or full stroke test.

The determination of the first break-away pressure prediction value pp1 can for example be carried out as follows:

The diagnostic apparatus 1 can in particular be configured to obtain the first break-away pressure prediction value pp1 by placing the characteristic line dk1 at the first break-away pressure measured value, i.e. by extrapolating the first break-away pressure measured value via the characteristic line dk1 to the first break-away pressure prediction value pp1. The characteristic line dk1 can in particular be present as a mathematical model or function.

Exemplarily, the diagnostic apparatus 1 can also be configured to determine a deviation $\Delta p1$ between the break-away pressure reference information pri, in particular between a first break-away pressure reference value prw1 lying on the characteristic line dk1 and the first break-away pressure measured value pi1. The first break-away pressure reference value prw1 is expediently stored in the break-away pressure reference information pri for the first position x1.

The diagnostic apparatus 1 can further be configured to perform a calculation using the deviation $\Delta p1$ and a break-away pressure reference value prw3 (hereinafter also referred to as the "third break-away pressure reference value"), in particular to add the deviation $\Delta p1$ to the break-away pressure reference value prw3, in order to obtain the first break-away pressure prediction value pp1. The third break-away pressure reference value prw3 is expediently stored in the break-away pressure reference information pri for the first prediction position xp1.

The diagnostic apparatus 1 is configured to perform the determination of the first break-away pressure prediction value pp1 according to a movement direction of the actuator element 15. For example, based on the movement direction, the part of the break-away pressure reference information, in particular the characteristic line dk1 or dk2, expediently one or a plurality of break-away pressure reference values, on which basis the break-away pressure prediction value pp1 is determined, is selected.

In the present case, for example, the first characteristic line dk1 or the second characteristic line dk2 is selected on the basis of the movement direction of the actuator element 15. The first characteristic line dk1 is selected for the first movement direction and the second characteristic line dk2 is selected for the second movement direction.

The diagnostic apparatus 1 is preferably further configured to provide a second break-away pressure measured value pi2 for a second position x2 of the actuator element 15 and to determine, based on the second break-away pressure measured value pi2 and the break-away pressure reference information pri, a second break-away prediction value pp2 for a second prediction position xp2, in particular a second end position, the second prediction position xp2 being different from the second position x2.

The diagnostic apparatus 1 is preferably configured to provide together and/or at the same time the first break-away pressure prediction value pp1 and the second break-away pressure prediction value pp2.

The second break-away pressure prediction value pp2 is expediently recorded for a movement of the actuator element into the second movement direction.

The determination of the second break-away pressure prediction value pp2 can be expediently carried out in correspondence to the determination of the first break-away pressure prediction value pp1.

For example, in a state, in which the actuator element 15 is in a rest position (also referred to as "resting state") in the second position x2, the working pressure is reduced and a second break-away pressure measured value pi2, at which the actuator element 15 is set into motion, is captured. The deviation Δp2 of the second break-away pressure measured value pi2 from a break-away pressure reference value prw2 associated with the second position x2 is determined and a calculation is performed using the deviation Δp2 and a fourth break-away pressure reference value prw4 associated with the second prediction position xp2, in particular, the deviation Δp2 is added to the fourth break-away pressure reference value prw4 in order to obtain the second break-away pressure prediction value pp2. For example, in the present case, the deviation Δp2 is negative, so that a second break-away pressure prediction value pp2 results, which is smaller than the fourth break-away pressure reference value prw4.

The second position x2 is in particular a current position and/or an actually adopted position of the actuator element 15. The second position is expediently a position at which the break-away pressure reference information pri has no maximum and/or no minimum.

The second prediction position xp2 is expediently not a current and/or not an actually adopted position of the actuator element 15. The second prediction position xp2 is preferably a position, which can in principle be adopted by the actuator element 15, but does not have to be adopted for the purposes of determining the break-away pressure prediction value. For example, the second prediction position xp2 is a second end position of the actuator element 15. The second prediction position xp2 is preferably a position at which the break-away pressure reference value is at its maximum or minimum.

In the example shown, the second break-away pressure prediction value pp2 is within the available pressure range, namely below the maximum working pressure pmax that can be provided and above the minimum working pressure pmin that can be provided. Consequently, it can be assumed that it is possible to set the actuator element 15 into motion from the prediction position xp2; i.e. that the functionality of the fluidic actuator 6 is also given for the second prediction position xp2.

The diagnostic apparatus 1 is expediently configured to check whether the first break-away pressure prediction value pp1 and/or the second break-away pressure prediction value pp2 are within the pressure range available for the working pressure. Based on the check, the diagnostic apparatus 1 can output a warning signal, in particular when at least one of the break-away pressure prediction values pp1, pp2 is outside of the available pressure range.

The diagnostic apparatus 1 can be configured to provide one, a plurality or all of the mentioned pressure values, in particular break-away pressure measured values, break-away pressure reference values and/or break-away pressure prediction values, as absolute pressure values and/or relative pressure values, for example pressure differences. For example, the mentioned pressure values can be provided as relative pressure values in relation to an environmental pressure, in particular atmospheric pressure.

The diagnostic apparatus 1 is preferably configured to provide the first break-away pressure prediction value pp1 and/or second break-away pressure prediction value pp2 as a transformed and/or normalized break-away pressure prediction value. A normalized and/or transformed break-away pressure prediction value can also be referred to as pressure requirement value.

A transformation of a break-away pressure prediction value shall in particular achieve that the two provided break-away pressure prediction values change in the same direction in the case of increasing stiffness, i.e. increasing wear or friction coefficients, of the actuator element 15. This transformation of a break-away pressure prediction value will be explained in detail below with reference to FIG. 3. Variables which are transposed in comparison to the representation in FIG. 1 may be marked with an additional abbreviation "t" in the reference numerals.

Exemplarily, the second break-away pressure prediction value is provided here as the transformed break-away pressure prediction value and is referred to as the second pressure requirement value PD2. The first break-away pressure prediction value is designated in FIG. 3 as the first pressure requirement value PD1.

Figure 3:
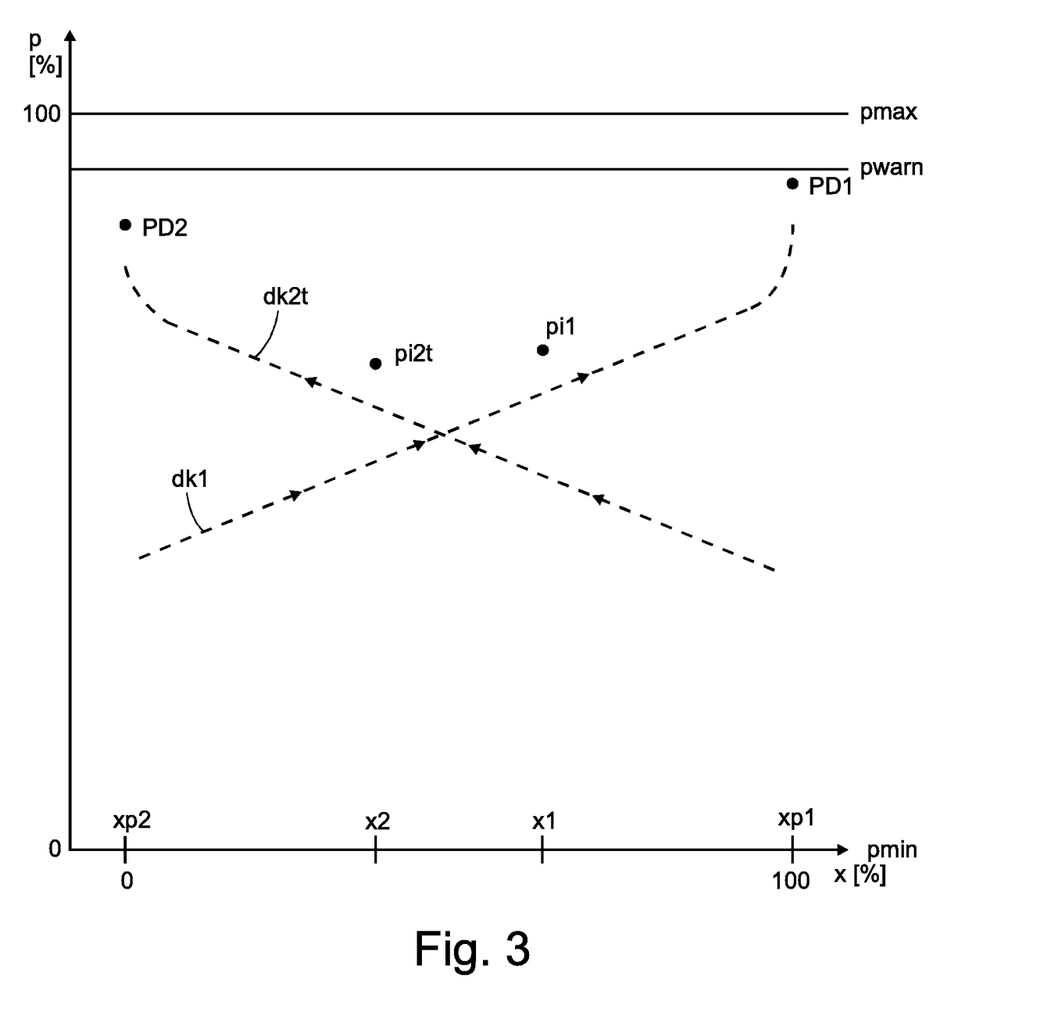
FIG. 3 shows a second graph, in which different pressure values are plotted in dependence of the position of the actuator element.

As already mentioned, the transformation takes place such that both break-away pressure prediction values, i.e. both pressure requirement values, change in the same direction in the case of increasing stiffness of the actuator element 15; i.e. both break-away pressure prediction values either increase or decrease.

In the example of FIG. 2 in which no transformation takes place, the two break-away pressure prediction values pp1, pp2 change in the case of increasing stiffness of the actuator element 15 in opposing directions. In the case of increasing stiffness, the two deviations Δp1 and Δp2 increase in terms of their absolute values; consequently, the first break-away pressure prediction value pp1 increases and the second break-away pressure prediction value pp2 decreases.

In contrast to this, in the example of FIG. 3, in the case of increasing stiffness and associated increase in amount of the deviations, both pressure requirement values PD1 and PD2 increase. Thereby, for example, the advantage can be achieved that the two pressure requirement values PD1, PD2 can be more easily managed and/or processed. The second break-away pressure prediction value is, in a sense, mirrored upwards so that it (as the second pressure requirement value PD2) moves in the same direction as the first pressure requirement value PD1.

This can be achieved by subjecting one of the two break-away pressure prediction values (here the second break-away pressure prediction value) to a transformation based on the maximum working pressure that can be provided. The transformation takes place for example on the basis of the difference between the maximum working pressure pmax that can be provided and the break-away pressure prediction value to be transformed.

Expediently, only one of the two break-away pressure prediction values is transformed and the other is preferably only scaled. The break-away pressure prediction value to be transformed can in particular be selected based on the movement direction of the actuator element 15, the movement direction being associated with the break-away pressure prediction value, and/or can be selected depending on whether the break-away pressure prediction value constitutes a lower limit value or an upper limit value.

The diagnostic apparatus 1 is further configured such that the break-away pressure reference information pri, in particular the second characteristic line dk2 and/or the second break-away pressure measured value, is already present in transformed form. A transformed second characteristic line dk2t, a transformed second break-away pressure measured value pi2t are shown in FIG. 3. The transformed values can be obtained on the basis of the maximum working pressure pmax that can be provided, in particular as the difference to the maximum working pressure pmax that can be provided.

The diagnostic apparatus 1 can further be configured to provide one, a plurality of or all of the aforementioned pressure values as normalized pressure values.

The pressure values can, for example, be normalized in relation to the maximum working pressure pmax that can be provided and/or in relation to the maximum available pressure range. For example, a pressure value, in particular a break-away pressure prediction value, can be indicated as a (percentage) proportion of a maximum available pressure range. In particular, the first and/or the second break-away pressure prediction value can be provided as the percentage number. Using the break-away pressure prediction value, it can therefore be efficiently indicated which proportion of the maximum available pressure range is already used up. In the case of a break-away pressure prediction value of 95%, it would e.g. be clear that almost the entire pressure range is used up and that in the case of a further increase to the wear, the actuator element 15 at the prediction position can possibly no longer be set into motion from the resting state.

For example, the pressure requirement values PD1 and PD2 shown in FIG. 3 are normalized pressure values, which are normalized here in relation to the maximum working pressure pmax that can be provided, and therefore are indicated as a percentage proportion of pmax.

By way of example, it is explained below how the pressure requirement values PD1, PD2 can be obtained in different situations:

The diagnostic apparatus 1 can use, as an auxiliary variable, a pressure position coupling $K_{px}$ for indicating the principle relationship between chamber pressure and position. The example illustrated in FIG. 2 relates in particular to a single-acting valve drive 19, whose break-away pressure p increases with increasing position value x, for which movements with increasing position values are thus achieved through supplying air. For such a case, a positive pressure position coupling is present, i.e.

$p \nearrow \Leftrightarrow x \nearrow : K_{px}=1$

In contrast to this, a negative pressure position coupling is present when the chamber pressure decreases with increasing position value:

$p \searrow \Leftrightarrow x \nearrow : K_{px}=-1$

A further auxiliary variable, which can be used by the diagnostic apparatus 1, relates to the movement direction:

$x \nearrow : dir_x=1$ $x \searrow : dir_x=-1$

In the case $K_{px}=1$, illustrated in FIG. 2, a friction-related limitation of the mobility is expressed in the form of increased break-away pressure values in the case of the positive movement direction, and in the form of reduced break-away pressure values in the case of a negative movement direction.

The pressure requirement value PD can, for example, be computed as a function of break-away pressure $p_{br}$, supply pressure $p_s$ and environmental pressure $p_{amb}$:

$$PD = \frac{p_{br} - p_{amb}}{p_s - p_{amb}}$$

in the case of movement by supplying air, $$PD = \frac{p_s - p_{br}}{p_s - p_{amb}}$$

in the case of movement by venting air.

The break-away pressure $p_{br}$ can, for example, be a (non-transformed and/or non-normalized) break-away pressure measured value and/or a (non-transformed and/or non-normalized) break-away pressure prediction value, the supply pressure $p_s$ can for example be the maximum working pressure pmax that can be provided and the environmental pressure $p_{amb}$ can for example be the atmospheric pressure.

In FIG. 3, the break-away pressure prediction values pp1, pp2 (of FIG. 2) are indicated as the pressure requirement values PD1, PD2.

For movements caused by supplying air, the pressure requirement value PD1 changes further in the direction of 100%, the closer the break-away pressure comes to the available supply pressure. For movements caused by venting air, the pressure requirement value PD2 increases further in the direction of 100%, the further the pressure has to be reduced in the direction of the environmental pressure, in order to move the actuator element 15.

The diagnostic apparatus 1 is expediently configured to determine the pressure requirement values as follows:

1. If $K_{px}=1$:
   a. For $dir_x=1$:
      i. compute pp1 at the upper end position with the aid of the break-away pressure reference information pri, in particular with the aid of a model function, ii. compute $PD1 = \dfrac{pp1 - p_{amb}}{p_s - p_{amb}}$ b. For $dir_x=-1$:
      i. compute pp2 at the lower end position with the aid of the model function ii. compute $PD2 = \dfrac{p_s - pp2}{p_s - p_{amb}}$ 2. If $K_{px}=-1$:
   a. For $dir_t=1$:
      i. compute pp1 at the upper end position with the aid of the model function ii. compute $PD1 = \dfrac{p_s - pp1}{p_s - p_{amb}}$ b. In the case of $dir_x=-1$:
      i. compute pp2 at the lower end position with the aid of the model function ii. compute $PD2 = \dfrac{pp2 - p_{amb}}{p_s - p_{amb}}$ In FIG. 3, the maximum working pressure pmax that can be provided, the threshold value pwarn, the first break-away pressure measured value pi1 and/or the first break-away pressure characteristic line dk1 are transformed and/or normalized variables, in particular transposed variables and can accordingly also be referred to as ptmax, ptwarn, pi1$t$ and/or dk1$t$.

The break-away pressure prediction values, in particular the pressure requirement values can expediently be processed or used in one or a plurality of the manners explained below:

The diagnostic apparatus 1 is preferably configured to compare the first and/or second break-away pressure prediction value to a threshold value and to provide, based on the comparison, warning information. The warning information can, for example, be provided to a user, the superordinate controller and/or the external server 17. The diagnostic apparatus 1 can further be configured to provide the first and/or second break-away pressure prediction value to the external server 17, and the external server 17 can preferably generate the warning information. In the example of FIG. 2, a different threshold value can expediently be provided for each break-away pressure prediction value pp1, pp2 respectively. If, as in FIG. 3, the break-away pressure prediction values are provided as pressure requirement values PD1, PD2, the same threshold value pwarn can be provided for both pressure requirement values PD1, PD2.

The break-away pressure prediction values pp1, pp2 can in particular serve as indicators for a state of wear and/or the functionality of the fluidic actuator 6.

The diagnostic apparatus 1 is expediently configured to provide, based on a break-away pressure prediction value, wear information and/or information on the remaining service life.

According to a possible configuration, the first and/or the second break-away pressure prediction value can be provided on a user interface on the external server 17, for example on a webserver provided on the external server 17.

The diagnostic apparatus 1 is further in particular configured for recording, viewing and evaluating the recorded data over a longer period and from a plurality of actuator devices in a plant. This can take place in a superordinate evaluation unit or in the cloud, for example in the external server 17. The diagnostic apparatus 1 is expediently configured to predict the failure time of an actuator device due to blockage on the basis of the time development (and the adaptation of a model for this time development). Alternatively or additionally, the diagnostic apparatus 1 is configured to indicate conspicuous developments in an actuating device in comparison to other devices, which are used under similar conditions.

Figure 4:
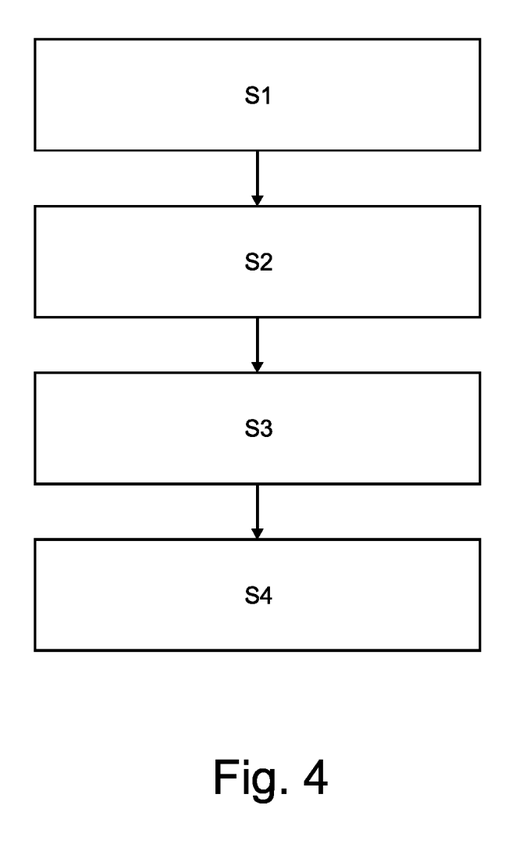
FIG. 4 shows a flow diagram of a method.

FIG. 4 shows a flow diagram of a method, which for example can be performed with the diagnostic apparatus 1 described above.

The method comprises the steps:

Providing, S1, a first break-away pressure measured value pi1 for a first position x1 of an actuator element 15 of a fluidic actuator 6, and determining, S2, a first break-away pressure prediction value pp1 for a first prediction position xp1 different from the first position x1, of the actuator element 15, based on the first break-away pressure measured value pi1 and break-away pressure reference information pri.

The method optionally further comprises the steps:

Providing, S3, a second break-away pressure measured value pi2 for a second position x2 of the actuator element 15 and determining, S4, a second break-away pressure prediction value pp2 for a second prediction position xp2 different from the second position x2, of the actuator element 15, based on the second break-away pressure measured value pi2 and the break-away pressure reference information pri.

What is claimed is:

1. A diagnostic apparatus for a fluidic actuator, which has an actuator element displaceable into different positions (x1, x2, xp1, xp2), wherein the diagnostic apparatus is configured to:

provide, for a first position (x1) of the actuator element, a first break-away pressure measured value (pi1); and determine, based on the first break-away pressure measured value (pi1) and break-away pressure reference information (pri) stored in the diagnostic apparatus, a first break-away pressure prediction value (pp1) for a first prediction position (xp1) of the actuator element, the first prediction position (xp1) being different from the first position (x1).

2. The diagnostic apparatus according to claim 1, wherein the first position (x1) is a current and/or actually adopted position of the actuator element and/or the first prediction position (xp1) is not a current and/or not an actually adopted position of the actuator element.

3. The diagnostic apparatus according to claim 1, wherein the first prediction position (xp1) is a first end position of the actuator element.

4. The diagnostic apparatus according to claim 1, wherein the diagnostic apparatus is configured to perform the determination of the first break-away pressure prediction value (pp1) according to a movement direction of the actuator element.

5. The diagnostic apparatus according to claim 1, wherein the break-away pressure reference information (pri) comprises a first break-away pressure characteristic line (dk1) for a first movement direction of the actuator element and/or a second break-away pressure characteristic line (dk2) for a second movement direction of the actuator element.

6. The diagnostic apparatus according to claim 5, wherein the first prediction position (xp1) is a position in which the first break-away pressure characteristic line (dk1) has a maximum or a minimum.

7. The diagnostic apparatus according to claim 1, wherein the diagnostic apparatus is further configured to:

provide, for a second position (x2) of the actuator element, a second break-away pressure measured value (pi2); and determine, based on the second break-away pressure measured value (pi2) and the break-away pressure reference information (pri), a second break-away pressure prediction value (pp2) for a second prediction position (xp2), the second prediction position (xp2) being different from the second position (x2).

8. The diagnostic apparatus according to claim 7, wherein the diagnostic apparatus is configured to determine the first break-away pressure prediction value (pp1) for a first movement direction of the actuator element and the second break-away pressure prediction value (pp2) for a second movement direction of the actuator element different from the first movement direction.

9. The diagnostic apparatus according to claim 1, wherein the diagnostic apparatus is configured to check whether the first break-away pressure prediction value (pp1) is within a pressure range available for the actuation of the fluidic actuator.

10. The diagnostic apparatus according to claim 1, wherein the diagnostic apparatus is configured to provide the first break-away pressure prediction value normalized in relation to a maximum working pressure that can be provided and/or a maximum available pressure range that can be provided.

11. The diagnostic apparatus according to claim 1, wherein the diagnostic apparatus is configured to compare the first break-away pressure prediction value to a threshold value and to provide, based on the comparison, warning information.

12. The diagnostic apparatus according to claim 1, wherein the diagnostic apparatus is configured to provide the first break-away pressure prediction value on a user interface on an external server.

13. A system, comprising a diagnostic apparatus according to claim 1 and a fluidic actuator with an actuator element.

14. The system according to claim 13, further comprising a control apparatus, and an external server, which is configured to provide the first break-away pressure prediction value (pp1) and/or information based on the first break-away pressure prediction value (pp1).

15. A method for diagnosing a fluidic actuator, the method comprising:
- providing, (S1), a first break-away pressure measured value (pi1) for a first position (x1) of an actuator element of the fluidic actuator, and
- determining, (S2), based on the first break-away pressure measured value (pi1) and break-away pressure reference information (pri), a first break-away pressure prediction value (pp1) for a first prediction position (xp1) of the actuator element, the first prediction position (xp1) being different from the first position (x1), and
- providing, based on the first break-away pressure prediction value, wear information and/or information on a remaining service life of the fluid actuator.

16. A diagnostic apparatus for a fluidic actuator, which has an actuator element displaceable into different positions (x1, x2, xp1, xp2), wherein the diagnostic apparatus is configured to:
- provide, for a first position (x1) of the actuator element, a first break-away pressure measured value (pi1);
- determine, based on the first break-away pressure measured value (pi1) and break-away pressure reference information (pri) stored in the diagnostic apparatus, a first break-away pressure prediction value (pp1) for a first prediction position (xp1) of the actuator element, the first prediction position (xp1) being different from the first position (x1);
- provide, for a second position (x2) of the actuator element, a second break-away pressure measured value (pi2); and
- determine, based on the second break-away pressure measured value (pi2) and the break-away pressure reference information (pri), a second break-away pressure prediction value (pp2) for a second prediction position (xp2), the second prediction position (xp2) being different from the second position (x2), wherein the diagnostic apparatus is configured to subject the first break-away pressure prediction value (pp1) and/or the second break-away pressure prediction value (pp2) to a transformation such that the first break-away pressure prediction value and the second break-away prediction value are moved in the same direction with increasing stiffness of the actuator element.

17. The diagnostic apparatus according to claim 16, wherein the diagnostic apparatus is configured to perform the transformation of the first break-away pressure prediction value and/or the second break-away pressure prediction value in dependence on the movement direction of the actuator element associated with the first break-away pressure prediction value and/or the second break-away pressure prediction value and/or in dependence on whether the first break-away pressure prediction value and/or the second break-away pressure prediction value constitutes an upper limit value or a lower limit value.

* * * * *

UNITED STATES PATENT AND TRADEMARK OFFICE
CERTIFICATE OF CORRECTION

PATENT NO. : 11,243,133 B2
APPLICATION NO. : 16/375277
DATED : February 8, 2022
INVENTOR(S) : Jan Reich, Holger Steltner and Uwe Leonhardt It is certified that error appears in the above-identified patent and that said Letters Patent is hereby corrected as shown below:

In the Claims

Claim 1: now reads:
"1. A diagnostic apparatus for a fluidic actuator, which has an actuator element displaceable into different positions (x1, x2, xp1, xp2), wherein the diagnostic apparatus is configured to:
- provide, for a first position (x1) of the actuator element, a first break-away pressure measured value (pi1); and
- determine, based on the first break-away pressure measured value (pi1) and break-away pressure reference information (pri) stored in the diagnostic apparatus, a first break-away pressure prediction value (pp1) for a first prediction position (xp1) of the actuator element, the first prediction position (xp1) being different from the first position (x1)."

Should read:
--1. A diagnostic apparatus for a fluidic actuator, which has an actuator element displaceable into different positions (x1, x2, xp1, xp2), wherein the diagnostic apparatus is configured to:
- provide, for a first position (x1) of the actuator element, a first break-away pressure measured value (pi1); and
- determine, based on the first break-away pressure measured value (pi1) and break-away pressure reference information (pri) stored in the diagnostic apparatus, a first break-away pressure prediction value (pp1) for a first prediction position (xp1) of the actuator element, the first prediction position (xp1) being different from the first position (x1),
wherein the diagnostic apparatus is configured to provide, based on the first break-away pressure prediction value, wear information and/or information on a remaining service life of the fluid actuator.--

Signed and Sealed this
Twelfth Day of July, 2022

Katherine Kelly Vidal
*Director of the United States Patent and Trademark Office*